United States Patent
Shim et al.

(10) Patent No.: US 10,281,765 B2
(45) Date of Patent: May 7, 2019

(54) BACKLIGHT UNIT PROVIDED WITH SUPPORTER OF LIGHT SOURCE UNIT, MANUFACTURING METHOD OF THE SUPPORTER, AND DISPLAY DEVICE INCLUDING THE BACKLIGHT UNIT

(71) Applicant: Samsung Display Co., Ltd., Yongin-si, Gyeonggi-do (KR)

(72) Inventors: Kyu-Hun Shim, Seoul (KR); Hyun Su Park, Hwaseong-si (KR); Min Su Jung, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/665,783

(22) Filed: Aug. 1, 2017

(65) Prior Publication Data
US 2018/0039136 A1     Feb. 8, 2018

(30) Foreign Application Priority Data

Aug. 2, 2016 (KR) .................. 10-2016-0098418

(51) Int. Cl.
G02F 1/1335 (2006.01)
F21V 8/00 (2006.01)
G02F 1/1333 (2006.01)

(52) U.S. Cl.
CPC ..... *G02F 1/133602* (2013.01); *G02B 6/0025* (2013.01); *G02B 6/0031* (2013.01);
(Continued)

(58) Field of Classification Search
CPC ......... G02F 1/133602; G02F 1/133308; G02F 2001/133325; G02B 6/0031; G02B 6/0025; G02B 6/0088
See application file for complete search history.

(56) References Cited

U.S. PATENT DOCUMENTS

2007/0139935 A1* 6/2007 Kim ............... G02B 6/0016
                                                          362/362
2011/0292315 A1* 12/2011 Bae ................ G02B 6/0088
                                                          349/58
(Continued)

FOREIGN PATENT DOCUMENTS

EP             2390692 A1    11/2011
KR    10-2006-0134658 A      12/2006
(Continued)

OTHER PUBLICATIONS

European Search Report dated Jan. 5, 2018, Application No. 17184529.0, 7 pages.

Primary Examiner — Donald L Raleigh
(74) Attorney, Agent, or Firm — Innovation Counsel LLP

(57) ABSTRACT

An exemplary embodiment provides a backlight unit including: a bottom chassis; a supporter positioned to extend along one edge of the bottom chassis; a light source unit fixed to the supporter; and a light guide plate that is positioned on the bottom chassis and is configured to transmit light emitted from a light source of the light source unit. The supporter may include a main body of which at least one corner area is cut and an insertion portion that is positioned at the corner area. Each of the main body and the insertion portion may include a base portion and a side wall, and the side wall of the insertion portion may extend from the side wall of the main body and in a direction different than a direction of the side wall of the main body.

22 Claims, 12 Drawing Sheets

(52) U.S. Cl.
CPC ......... *G02B 6/0088* (2013.01); *G02B 6/0091* (2013.01); *G02F 1/133308* (2013.01); *G02F 1/133615* (2013.01); *G02B 6/0085* (2013.01); *G02F 2001/133325* (2013.01)

(56) References Cited

U.S. PATENT DOCUMENTS

| | | | |
|---|---|---|---|
| 2012/0092584 A1* | 4/2012 | Jung ...................... | G02B 6/009 349/58 |
| 2013/0044508 A1* | 2/2013 | Bae ................... | G02F 1/133615 362/602 |
| 2013/0208510 A1* | 8/2013 | Takashima .............. | G09F 13/04 362/615 |
| 2016/0273742 A1* | 9/2016 | Hsieh .................... | G02F 1/1335 |
| 2016/0291243 A1* | 10/2016 | Okitsu ................. | G02B 6/0085 |

FOREIGN PATENT DOCUMENTS

| | | |
|---|---|---|
| KR | 10-2012-0064524 A | 6/2012 |
| KR | 10-2012-0078961 A | 7/2012 |
| KR | 10-2015-0047307 A | 5/2015 |

\* cited by examiner

BACKLIGHT UNIT PROVIDED WITH SUPPORTER OF LIGHT SOURCE UNIT, MANUFACTURING METHOD OF THE SUPPORTER, AND DISPLAY DEVICE INCLUDING THE BACKLIGHT UNIT

CROSS-REFERENCE TO RELATED APPLICATION

This application claims priority to and the benefit of Korean Patent Application No. 10-2016-0098418 filed in the Korean Intellectual Property Office on Aug. 2, 2016, the entire contents of which are incorporated herein by reference.

BACKGROUND

(a) Technical Field

This disclosure relates to a backlight unit provided with a supporter of a light source unit, a manufacturing method of the supporter, and a display device including the backlight unit.

(b) Description of the Related Art

A liquid crystal display (LCD) is presently one of the most widely used display devices. The liquid crystal display applies an electric field to a liquid crystal panel including a liquid crystal layer to change alignment of liquid crystal molecules to control light transmittance, thereby displaying an image. The liquid crystal panel itself is non-emissive, so the liquid crystal display generally includes a backlight unit for supplying light to the liquid crystal panel at a rear side thereof.

Conventionally, a CCFL has been widely used as a light source for the backlight unit, but an LED has recently been gaining popularity since it provides superior color reproducibility, a longer lifespan, and less power consumption compared to the CCFL. In terms of design aspects, there is a demand for a slimmer display device with a thin bezel, thus the backlight unit may be a major factor in designing the slimmer display device.

The above information disclosed in this Background section is only for enhancement of understanding of the background and therefore it may contain information that does not form the prior art that is already known in this country to a person of ordinary skill in the art.

SUMMARY

Embodiments provide a backlight unit that may minimize a bezel width of a display device and may improve uniformity of light, a method for simply manufacturing a supporter of a light source unit in the backlight unit, and a display device including the backlight unit.

An exemplary embodiment provides a backlight unit including: a bottom chassis; a supporter positioned to extend along one edge of the bottom chassis; a light source unit fixed to the supporter; and a light guide plate that is positioned on the bottom chassis and is configured to transmit light emitted from a light source of the light source unit. The supporter may include a main body of which at least one corner area is cut, and an insertion portion that is positioned at the corner area. Each of the main body and the insertion portion may include a base portion and a side wall, and the side wall of the insertion portion may extend from the side wall of the main body and in a direction different than a direction of the side wall of the main body.

Two side surfaces of the insertion portion may directly contact two side surfaces of the main body.

At a portion at which the two side surfaces of the insertion portion directly contact the two side surfaces of the main body, an upper surface of the base portion of the insertion portion may be flush with an upper surface of the base portion of the main body.

The upper surface of the base portion of the insertion portion may be substantially trapezoidal.

Each of the main body and the insertion portion may be fixed to the bottom chassis by a screw.

One of the base portion of the insertion portion and the base portion of the main body may include a protrusion, and the other thereof may include a receiving portion corresponding to the protrusion.

The protrusion may include a portion having a width that widens closer to an end thereof.

The protrusion may have a wedge-shaped cross-section.

The insertion portion may include a first insertion portion and a second insertion portion that directly contact each other, and a direction in which a side wall of the first insertion portion extends and a direction in which a side wall of the second insertion portion extends may intersect.

The light source unit may include a substrate and a plurality of light sources mounted to the substrate. The substrate may include a first portion and a second portion extending from the first portion, and may be bent at a boundary of the first portion and the second portion.

The first portion of the substrate may face the side wall of the main body of the supporter, and the second portion of the substrate may face the side wall of the insertion portion of the supporter.

Another embodiment provides a manufacturing method of a supporter which fixes a light source unit in a backlight unit, including: forming an extrusion bar that includes a base portion and a side portion; cutting the extrusion bar to a predetermined length, and forming a main body of the supporter by cutting at least one corner area of the cut extrusion bar; forming an insertion portion that is fitted to the corner area of the main body by cutting a portion including the base portion and the side portion of the extrusion bar; and inserting the insertion portion into the corner area of the main body.

In the supporter, a side wall of the insertion portion may extend from a side wall of the main body and in a direction different than a direction of the side wall of the main body.

In the supporter, two side surfaces of the insertion portion may directly contact two side surfaces of the main body, and at a portion at which the two side surfaces of the insertion portion directly contact the two side surfaces of the main body, an upper surface of the base portion of the insertion portion may be flush with an upper surface of the base portion of the main body.

The cutting of the at least one corner area of the cut extrusion bar may include cutting the corner area in a substantially rectangular planar shape.

The cutting of the portion including the base portion and the side portion of the extrusion bar may include cutting the portion in a substantially trapezoidal planar shape.

Yet another embodiment provides a display device including: a display panel; and a backlight unit that is configured to provide light to the display panel. The backlight unit may include: a bottom chassis; a supporter positioned to extend along one edge of the bottom chassis; a light source unit fixed to the supporter; and a light guide plate that is positioned on the bottom chassis and is configured to transmit light emitted from a light source of the light source unit. The supporter may include a main body of which at least one corner area is cut, and an insertion portion that is positioned at the corner area. Each of the main body and the insertion portion may include a base portion and a side wall, and the side wall of the insertion portion may extend from the side wall of the main body and in a direction different than a direction of the side wall of the main body.

Two side surfaces of the insertion portion may directly contact two side surfaces of the main body, and at a portion at which the two side surfaces of the insertion portion directly contact the two side surfaces of the main body, an upper surface of the base portion of the insertion portion may be flush with an upper surface of the base portion of the main body.

The light source unit may include a substrate and a plurality of light sources mounted to the substrate. The substrate may include a first portion and a second portion extending from the first portion, and may be bent at a boundary of the first portion and the second portion.

The first portion of the substrate may face the side wall of the main body of the supporter, and the second portion of the substrate may face the side wall of the insertion portion of the supporter.

The bottom chassis may be positioned between the base portions of the main body and the insertion portion and the light guide, and the light source unit may be positioned between the side walls of the main body and the insertion portion and one end portion of the light guide plate.

A corner of the display device may be rounded.

According to the embodiments, it is possible to minimize a bezel width of a display device and to improve uniformity of light emitted from a backlight unit. Further, it is possible to simply and inexpensively manufacture a supporter for fixing a light source unit to the backlight unit.

DETAILED DESCRIPTION OF THE EMBODIMENTS

Figure 1:
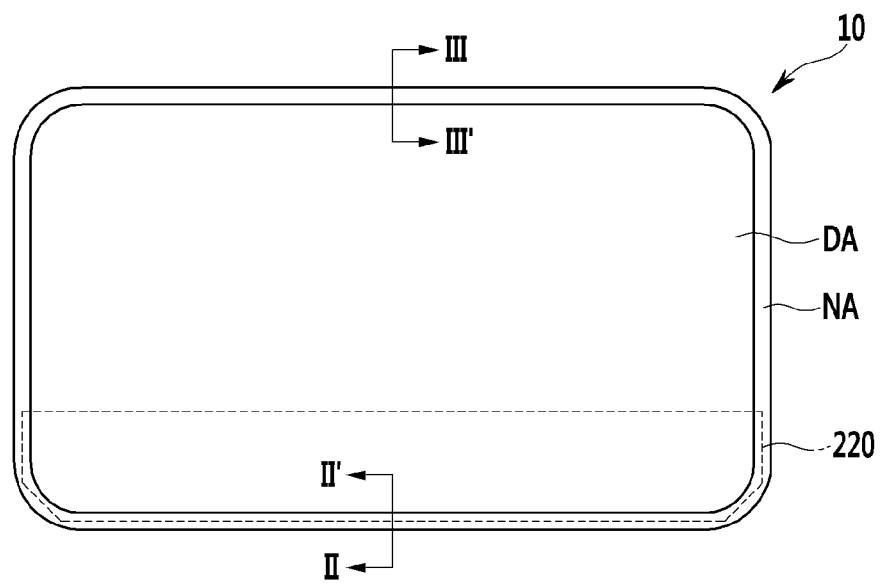
FIG. 1 illustrates a schematic view of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the present disclosure.

To clearly describe the present disclosure, portions which do not relate to the description are omitted, and like reference numerals designate like elements throughout the specification.

Further, the size and thickness of each component shown in the drawings are arbitrarily shown for better understanding and ease of description, but the present disclosure is not limited thereto. In the drawings, the thickness of layers, films, panels, regions, etc., are exaggerated for clarity. For better understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or above the object portion without a gravitational reference.

In addition, unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

A display device according to an exemplary embodiment will now be described in detail with reference to FIG. 1 to FIG. 3. The display device may be a liquid crystal display, but is not limited to thereto, and it may be a non-emission display device including a backlight unit.

Figure 2:
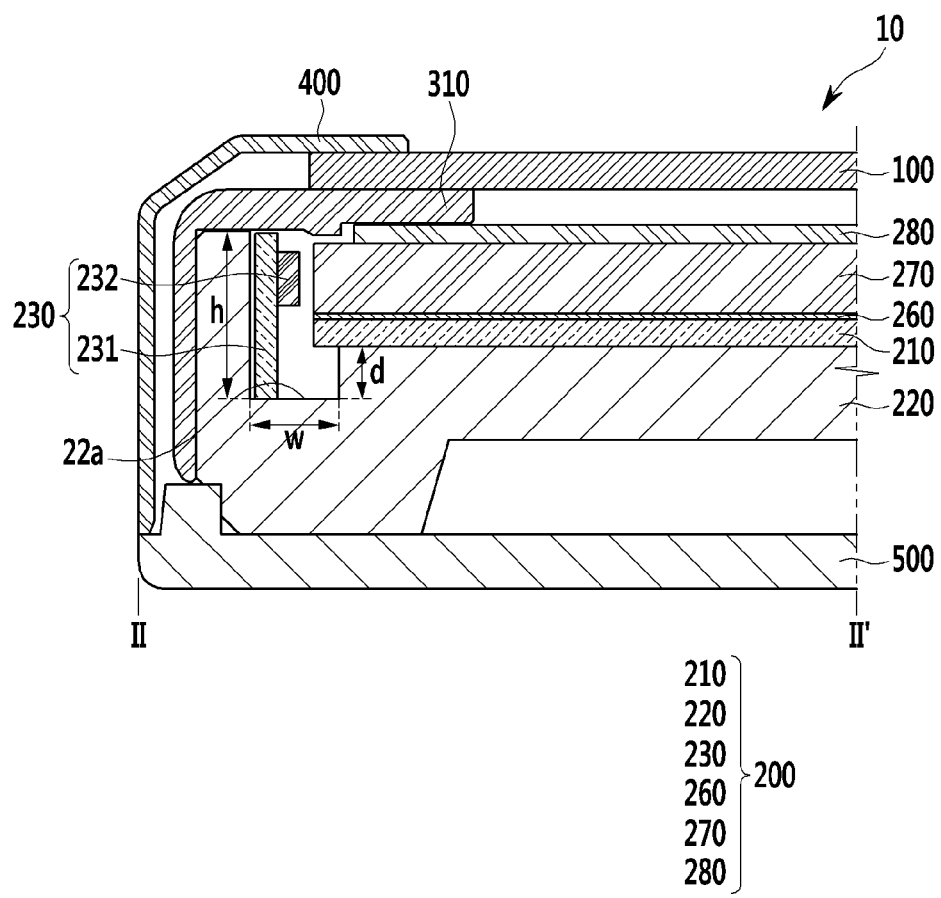
FIG. 2 illustrates a cross-sectional view taken along line II-IP of FIG. 1.
Figure 3:
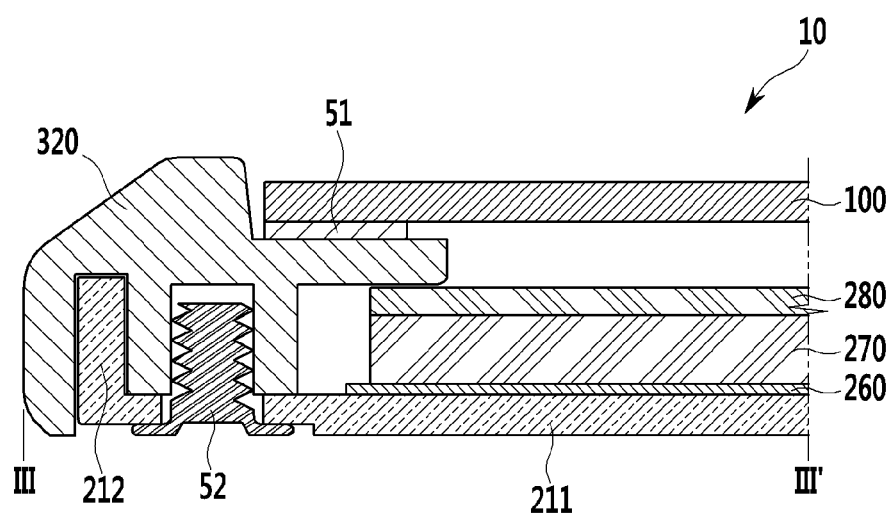
FIG. 3 illustrates a cross-sectional view taken along line III-III' of FIG. 1.

FIG. 1 illustrates a schematic view of a display device 10 according to an exemplary embodiment, FIG. 2 illustrates a cross-sectional view taken along line II-II' of FIG. 1, and FIG. 3 illustrates a cross-sectional view taken along line of FIG. 1.

FIG. 1 schematically illustrates a front view of the display device 10. The display device 10 is rectangular overall, but is formed to have rounded corners. A display area DA for displaying an image occupies most of an entire region of the display device 10, and a non-display area NA surrounds the display area DA. The non-display area NA is called a bezel. The display area DA is rectangular overall to be similar to the display device 10, and is formed to have rounded corners. It is illustrated that the display device 10 and the display area DA respectively have four rounded corners in FIG. 1, but they may have variously shaped corners. For example, they may be formed to have an overall octagonal shape with oblique corners, a rectangular shape with angular corners, or a shape with only one or two rounded corners.

FIG. 2 illustrates a cross-sectional view of an edge portion (hereinafter referred to as a light input section) at which a light source unit 230 of the display device 10 shown in FIG. 1 is positioned, and FIG. 3 illustrates a cross-sectional view of an edge portion (hereinafter referred to as an opposing light section) at which the light source unit 230 of an opposite side of the light input section is not positioned. Although the light input section may be positioned on at least one edge of the display device 10, the case in which it is positioned on a lower edge thereof will be exemplarily described. FIG. 3 illustrates a cross-sectional view of an upper edge portion of the display device 10, but cross-sectional views of a left edge portion and a right edge portion may correspond to FIG. 3.

Referring to FIG. 1, FIG. 2, and FIG. 3, the display device 10 includes a display panel 100 and a backlight unit 200. The display device 10 includes frames 310 and 320 for fixing the display panel 100 to the backlight unit 200 between the display panel 100 and the backlight unit 200. The display device 10 includes a top chassis 400 which covers an edge of the display panel 100, protects the display panel 100, and prevents the display panel 100 from being separated from the backlight unit 200. In the shown exemplary embodiment, the top chassis 400 is positioned only at the light input section, but the top chassis 400 may be positioned along a border of the display device 10, or may be omitted. A back cover 500 which covers a drive device, a power supply, and the like for operating the display device 10 is positioned at a back surface of the backlight unit 200.

The display panel 100 is a liquid crystal panel in which a liquid crystal layer is interposed between two transparent substrates that are provided with switching elements, electrodes, color filters, etc., and a polarizer is attached to a surface of each substrate. The display panel 100 displays an image by controlling transmittance of light that is emitted from the backlight unit 200, and passes through the polarizer and the liquid crystal layer by a drive device.

The backlight unit 200 for providing light to the display panel 100 is positioned below the display panel 100. The backlight unit 200 includes a bottom chassis 210, a supporter 220, the light source unit 230, and optical elements 260, 270, and 280, i.e., a reflective sheet 260, a light guide plate 270, and an optical sheet 280, respectively, for uniformly providing light emitted from the light source unit 230 to the display panel 100.

An upper portion of the bottom chassis 210 is open, and the bottom chassis 210 is a container with a predetermined depth. For example, the bottom chassis 210 may be substantially formed to have an entirely rectangular tray shape. The bottom chassis 210 includes a substantially flat bottom plate 211, and a side wall 212 upwardly extending from a circumference of the bottom plate 211. The side wall 212 may be formed to have the same height at four edges of the bottom chassis 210 or to have a different height at at least one edge thereof, or the side wall 212 may not be formed at any edge thereof. For example, the side wall of the bottom chassis 210 may not be formed at the light input section at which the light source unit 230 is positioned, as shown in FIG. 2.

The bottom chassis 210 may be made of a metal material such as aluminum, an aluminum alloy, and a zinc-coated steel plate. The bottom chassis 210 may be made of a plastic material such as polycarbonate.

The optical elements including the reflective sheet 260, the light guide plate 270, and the optical sheet 280 are accommodated in the bottom chassis 210. In the light input section, the supporter 220 to which the light source unit 230 including a substrate 231 and light sources 232 is combined is positioned at a back surface of the bottom chassis 210.

The supporter 220 fixes the light source unit 230, and it serves as a kind of radiating component for transmitting heat generated from the light source unit 230 to the bottom chassis 210. The supporter 220 may be made of a metal material having good thermal conductivity to quickly transmit the heat generated from the light source unit 230 to the bottom chassis 210, thereby preventing the light source unit 230 from overheating. For example, the supporter 220 may be made of aluminum, an aluminum alloy, or the like by using extrusion molding.

The supporter 220 may be fixed to the bottom chassis 210 by a fastening member such as a screw so that the light source unit 230 may be maintained at a predetermined position. Since the supporter 220 accommodates the light source unit 230, as shown with a dotted line in FIG. 1, it is positioned throughout an entire length of the light input section. Although an entire planar shape of the supporter 220 is substantially rectangular, two corners facing in a long side direction thereof are formed like being obliquely cut for minimizing a bezel width of the display device 10 and fitting them to the rounded corners of the display device 10. The obliquely cut corners of the supporter 220 may be positioned between the rounded corners of the display device 10 and the rounded corners of the display area DA. Detail structures of the supporter 220 and the light source unit 230 will be described later.

The light guide plate 270 accommodated in the bottom chassis 210 is positioned on the bottom plate 211 of the bottom chassis 210 so that one edge thereof may be adjacent to the light source 232. The light guide plate 270 guides light emitted from the light source 232 and transmits it to the liquid crystal panel 100, also called the display panel 100. The light guide plate 270 serves to convert the light generated from the light source unit 230, which has an optical distribution of a point or line light source, into light having an optical distribution of a surface light source, that is, to uniformly distribute the generated light. The light guide plate 270 may be slightly larger than the display area DA so as to provide light to an overall display area DA of the display device 10. In the planar shape thereof, the corners of the light guide plate 270 may be obliquely or roundly formed to correspond to the display area DA with the rounded corners. For example, the light guide plate 270 may have an overall octagonal planar shape.

The reflective sheet 260 is positioned below the light guide plate 270, that is, between the light guide plate 270 and the bottom chassis 210. The reflective sheet 260 reflects the light traveling toward the light guide plate 270 such that the reflected light is finally directed toward the display panel 100, thereby improving optical efficiency. The reflective sheet 260 may have a planar shape corresponding to the light guide plate 270.

The optical sheet 280 is positioned on the light guide plate 270. For example, the optical sheet 280 may include a diffuser sheet, a prism sheet, and a protective sheet. The diffuser sheet is used to allow the light emitted from the light guide plate 270 to have uniform distribution, that is, to generate a surface light source of uniform brightness. The prism sheet controls a traveling direction of the light diffused by the diffuser sheet to be perpendicular to the display panel 100. The protective sheet may be used to protect a prism of the prism sheet from scratches and the like. The protective sheet may also serve to widen a viewing angle that is previously narrowed by the prism sheet by diffusing light. The optical sheet 280 may not include any of the prism sheet and the protective sheet, or may include a plurality of prism sheets or protective sheets. The optical sheet 280 may further include a reflective polarizer sheet that can improve luminance efficiency by separating, transmitting, and reflecting polarization components of light. The optical sheet 280 may have a planar shape corresponding to the light guide plate 270.

In the frames 310 and 320 for stably fixing the display panel 100 at a predetermined height, the frame 310 positioned at the light input section is structurally different from the frame 320 positioned at the opposing light section. For example, the frame 310 of the light input section may include a portion closely attached to a side surface of the supporter 220 and a portion pressing the optical sheet 280, and the frame 320 of the opposing light section may include a portion into which the side wall 212 of the bottom chassis 210 is inserted to be closely attached to the bottom chassis 210 and a portion pressing the optical sheet 280. The frame 320 is fixed to the bottom chassis 210 by a screw 52. The frame 310 may be fixed to the supporter 220 by a fastening member (not shown) such as a screw or a hook. The display panel 100 is fixedly attached to a flat surface of frame 320 by an adhesion member 51 such as a double-sided adhesive tape. In the light input section, the display panel 100 is fixed on the flat surface of the frame 310, or may not be fixed thereon but may be placed thereon. The frame 310 may be covered by the top chassis 400, and some of the frame 320 may be exposed to the outside. Based on such a structure, the display device 10 may be designed to have a thin thickness.

The overall configuration of the display device 10 has been described. The supporter 220 and the light source unit 230 of the backlight unit 200 of the display device 10 according to the exemplary embodiment will now be described in detail. Although not specially mentioned below, the previously described drawings will be referred to.

Figure 4:
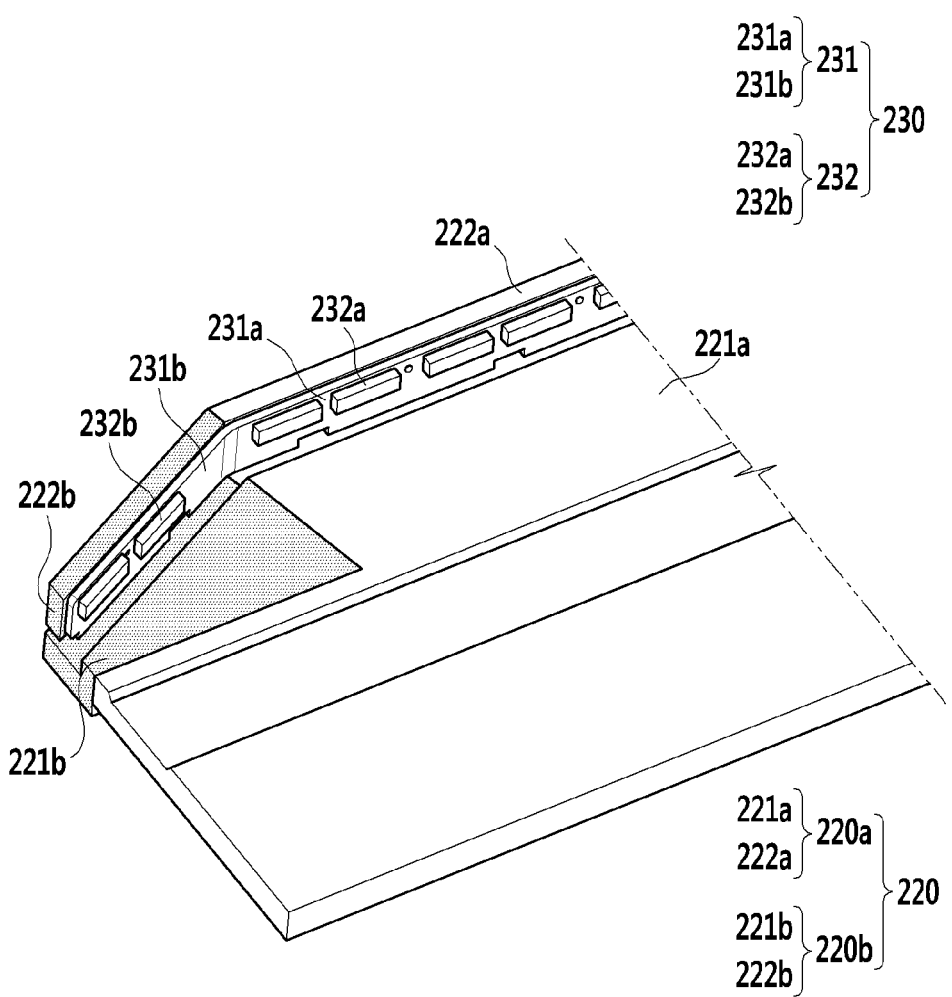
FIG. 4 is a schematic view illustrating an end portion of a supporter according to an exemplary embodiment along with a light source unit.
Figure 5:
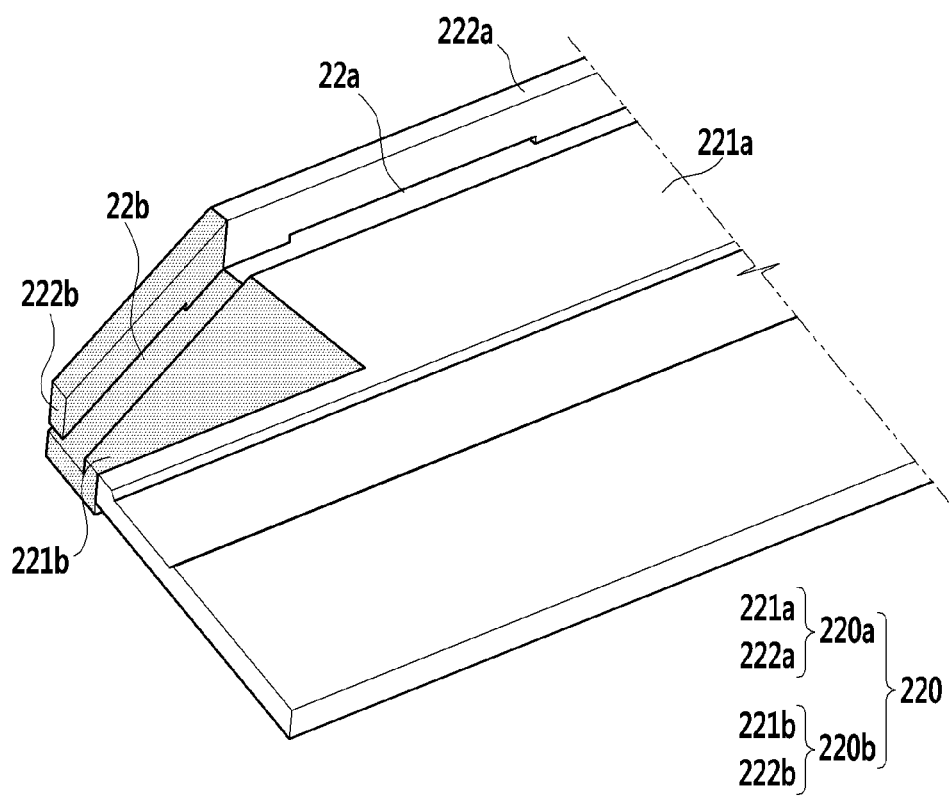
FIG. 5 is a schematic view illustrating only the end portion of the supporter excluding the light source unit from FIG. 4.
Figure 6:
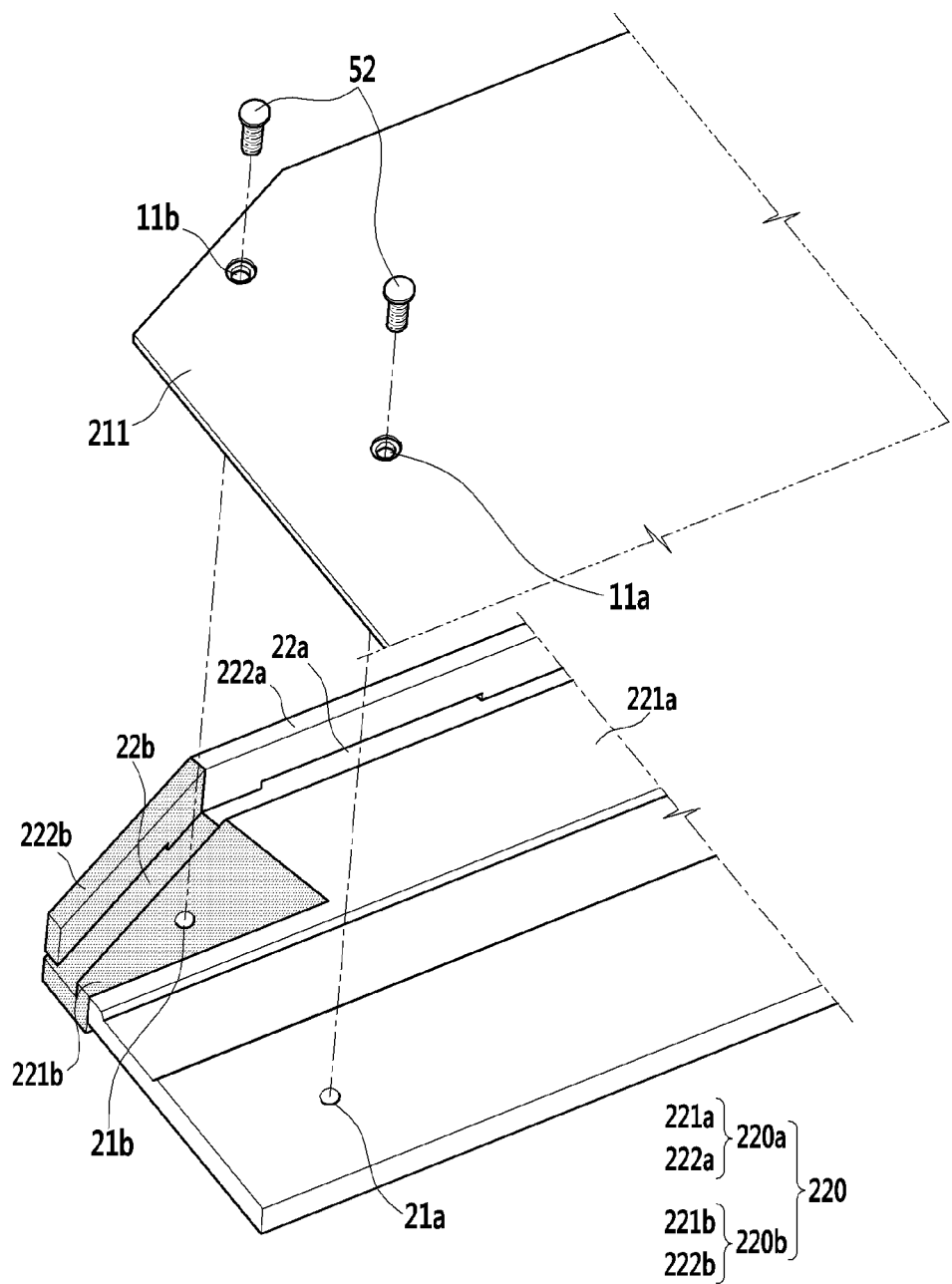
FIG. 6 illustrates an exemplary view of a state in which a supporter and a bottom chassis according to an exemplary embodiment are fastened.

FIG. 4 is a schematic view illustrating an end portion of a supporter 220 according to an exemplary embodiment along with a light source unit 230, FIG. 5 is a schematic view illustrating only the end portion of the supporter 220 excluding the light source unit 230 from FIG. 4, and FIG. 6 illustrates an exemplary view of a state in which the supporter 220 and a bottom plate 211 of a bottom chassis 210 according to an exemplary embodiment are fastened.

Referring to FIG. 4 and FIG. 5, one end portion of the supporter 220 and the light source unit 230 is illustrated. The supporter 220 includes a main body 220a and an insertion portion 220b positioned at a corner area of the main body 220a. An opposite end portion of the supporter 220 may be symmetrical with respect to the shown end portion, thus a description for the opposite end portion will be omitted.

The main body 220a of the planar shape has a shape in which one corner area of an entirely long rectangle is cut to have a substantially rectangular form. The main body 220a includes a base portion 221a for limiting the overall planar shape and a side wall 222a upwardly protruding along an edge of one long side direction of the base portion 221a. Referring to FIG. 2 as well, the base portion 221a may include a trench 22a formed by being slightly dug by a predetermined width (w) and depth (d) near the side wall 222a. A height (h) of the side wall 222a may be entirely constant, and it may be substantially the same as a width of short side direction of the substrate 231 of the light source unit 230.

The insertion portion 220b is positioned to fill the cut corner area of the main body 220a, and it has a planar shape substantially of a trapezoid. Accordingly, in the supporter 220, the portion at which the insertion portion 220b is positioned has a planar shape in which one corner of the rectangle is obliquely cut. Similar to the main body 220a, the insertion portion 220b includes a base portion 221b and a side wall 222b, and a height of the side wall 222b may be the same as that of the side wall 222a. Similar to the planar shape of the insertion portion 220b, a top surface of the base portion 221b may be trapezoidal. The base portion 221b may include a trench 22b near the side wall 222b, and a width and depth thereof may correspond to the width and depth of the trench 22a of the base portion 221a.

Two side surfaces of the insertion portion 220b directly contact the two cut side surfaces of the main body 220a to fit therein. In a portion at which the two side surfaces of the insertion portion 220b directly contact the corresponding two side surfaces of the main body 220a, a top surface of the base portion 221b of the insertion portion 220b is flush with a top surface of the base portion 221a of the main body 220a. Accordingly, even though the main body 220a and the insertion portion 220b are separate components, they are smoothly connected to each other as just one component. Thus, it is possible to prevent an undesired warp or gap from occurring in and between elements such as the bottom chassis 210 and the light guide plate 270 that may be positioned on the supporter 220.

The side wall 222a of the main body 220a and the side wall 222b of the insertion portion 220b directly contact each other as a single bent side wall. Accordingly, the side wall 222a and the side wall 222b extend in different directions. For example, an extending direction of the side wall 222a and an extending direction of the side wall 222b may form an angle of about 20 to 70 degrees, but the embodiments are not limited thereto. The cut corner of the supporter 220 is defined by the directions in which the side walls 222a and 222b extend.

Referring FIG. 2 as well, in the backlight unit 200, the base portions 221a and 221b of the supporter 220 may be positioned to be closely attached to a lower portion of the bottom chassis 210, and the side walls 222a and 222b of the supporter 220 may be positioned to be spaced apart from the side surface of the bottom chassis 210. The supporter 220 may be combined with the bottom chassis 210 by a fastening member (not shown) such as a screw that passes through the bottom chassis 210 and is tightened with the supporter 220. In further detail, referring to FIG. 6, the main body 220a of the supporter 220 may include a hole 21a formed in the base portion 221a, and the bottom chassis 210 may include a hole 11a formed in the bottom plate 211 at a position corresponding to the hole 21a. Further, the insertion portion 220b of the supporter 220 may include a hole 21b formed in the base portion 221b, and bottom chassis 210 may include a hole 11b formed in the bottom plate 211 at a position corresponding to the hole 21b. The main body 220a may be fixed to the bottom chassis 210 by the screw 52 passing through the hole 11a to be coupled with the hole 21a, and the insertion portion 220b may be fixed to the bottom chassis 210 by the screw 52 passing through the hole 11b to be coupled with the hole 21b. Accordingly, even though the supporter 220 is formed to have the main body 220a and the insertion portion 220b be independent as separate pieces, each of them is coupled with the bottom chassis 210 by the screw, thereby maintaining the supporter 220 to have a predetermined shape.

The light source unit 230 is fixed to the side walls 222a and 222b of the supporter 220. The light source unit 230 includes the substrate 231 and the light sources 232 mounted on the substrate 231. The substrate 231 supports the light sources 232 and supplies power thereto. The substrate 231 may have an elongated bar shape having an overall narrow width. A wide surface of the substrate 231 is closely attached to the side walls 222a and 222b through an adhesion member (not shown) such as a double-sided adhesive tape.

The substrate 231 may be fixed to the side walls 222a and 222b by a fastening member such as a screw. Some of the substrate 231 may be positioned in the trenches 22a and 22b.

The substrate 231 may be a printed circuit board (PCB), and particularly, may be a metal core printed circuit board (MCPCB). The substrate 231 is closely attached to the side walls 222a and 222b of the supporter 220, and the supporter 220 is closely attached to the bottom chassis 210, thus heat generated from the light sources 232 is rapidly transmitted to the bottom chassis 210 through the substrate 231 and the supporter 220 to be able to be discharged to the outside. That is, the substrate 231, the supporter 220, and the bottom chassis 210 may serve as a heat sink of the light sources 232.

The light sources 232 are electrically connected to a wire of the substrate 231 to receive power, thereby converting electrical energy into light energy and then emitting it. The light sources 232 may be a light emitting diode (LED) package, and may be disposed at predetermined intervals on the substrate 231. The light sources 232 are positioned between the side walls 222a and 222b and the light guide plate 270 so that light emitting surfaces thereof are toward the light guide plate 270. A point light source or a linear light source other than the LED package may be used as the light sources 232, generally referred to as the light source 232.

The substrate 231 includes a first portion 231a and a second portion 231b. The first portion 231a and the second portion 231b correspond to portions of the substrate 231 which is bent, and they are divided based on the bent boundary. The first portion 231a is attached to the side wall 222a of the main body 220a, and the second portion 231b is attached to the side wall 222b of the insertion portion 220b. Accordingly, the substrate 231 may be maintained in a state of being bent at a predetermined angle, and the light source 232 including light sources 232a and 232b positioned at the respective portions 231a and 231b may be maintained in a designed position and direction in the display device 10.

In the present exemplary embodiment, since the corner of the display area DA of the display device 10 is rounded, in order to evenly provide light to all of the display area DA, it is required that the light source 232b is disposed closely thereto to correspond to the rounded corner portion of the display area DA. If not so, since left and right edges of the display area DA are relatively darkened, a complicated structure and drive design for compensating this may be required. In the present exemplary embodiment, the end portion of the light source unit 230 is formed to be bent, and the supporter 220 consisting of a combination of the main body 220a and the insertion portion 220b is formed to be able to fix the light source unit 230 with the bent end portion. Accordingly, the light source 232 may be disposed at the rounded corner portion of the non-display area (NA) of the display device 10, and the corner of the display device 10 may be designed to be rounded while minimizing the bezel width thereof.

Another exemplary embodiment will now be described with reference to FIG. 7, FIG. 8, FIG. 9, and FIG. 10.

Figure 7:
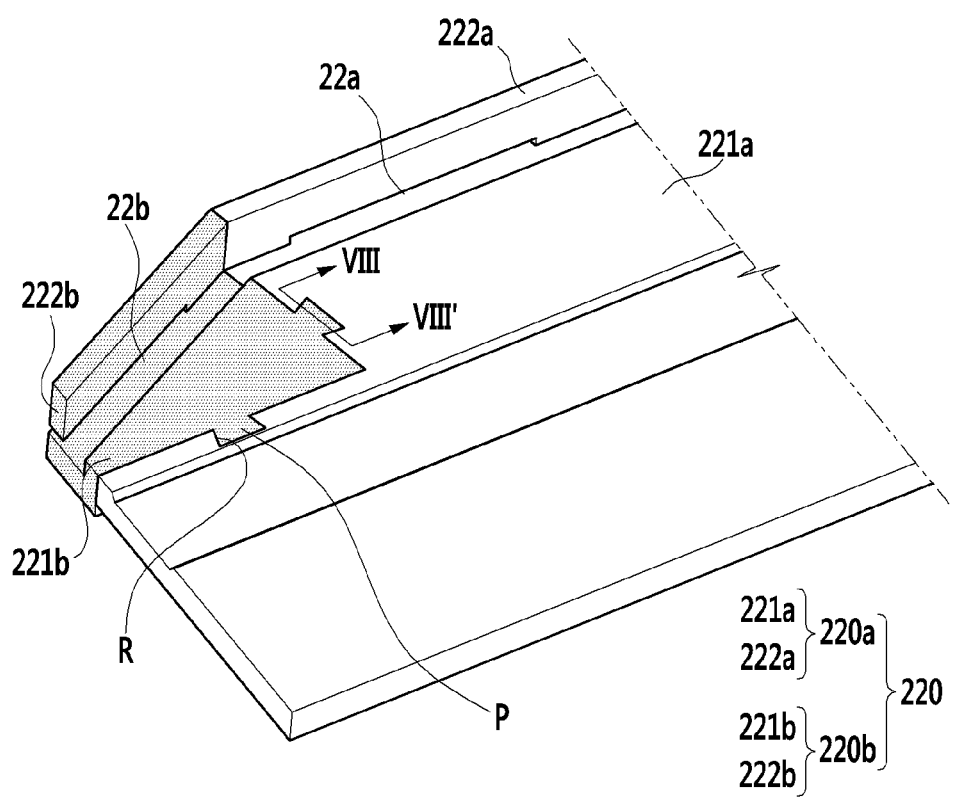
FIG. 7 illustrates a schematic view of an end portion of a supporter according to an exemplary embodiment.
Figure 8:
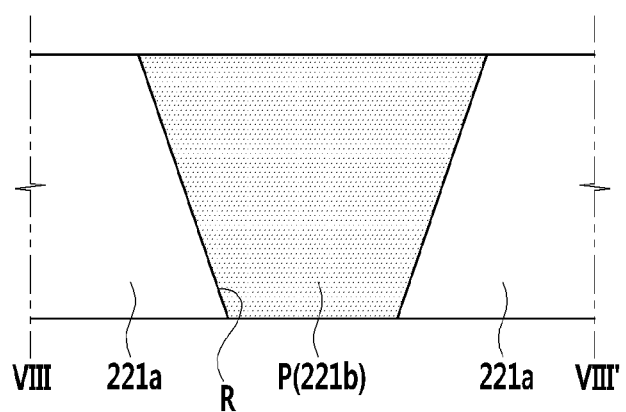
FIG. 8 illustrates a cross-sectional view taken along line VIII-VIII' of FIG. 7.
Figure 9:
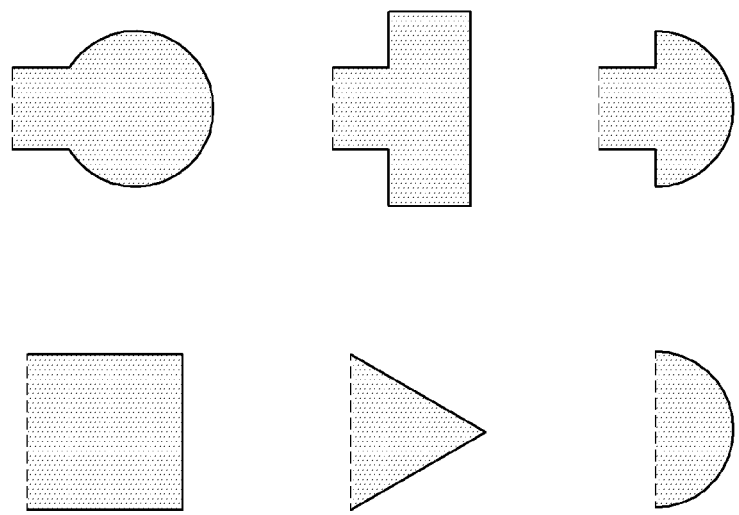
FIG. 9 illustrates a schematic view of various planar shapes of protrusions of a supporter according to an exemplary embodiment.
Figure 10:
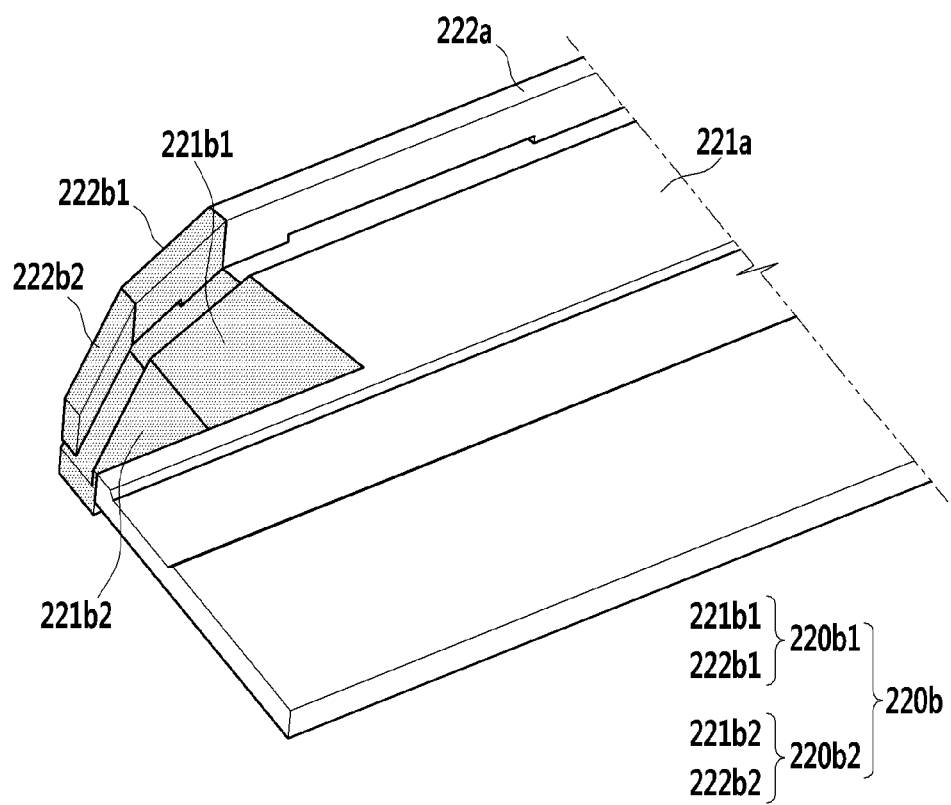
FIG. 10 illustrates a schematic view of an end portion of a supporter according to another exemplary embodiment.

FIG. 7 illustrates a schematic view of an end portion of a supporter 220 according to an exemplary embodiment, FIG. 8 illustrates a cross-sectional view taken along line VIII-VIII' of FIG. 7, and FIG. 9 illustrates a schematic view of various planar shapes of protrusions of a supporter according to an exemplary embodiment. FIG. 10 illustrates a schematic view of an end portion of a supporter 220b according to another exemplary embodiment.

Referring to FIG. 7, the supporter 220 including the main body 220a and the insertion portion 220b is shown. An overall structure of the supporter 220 is substantially the same as the exemplary embodiment of FIG. 5, but there is a difference in that structures P, R for limiting relative movement of the main body 220a and the insertion portion 220b are included therein.

Specifically, the insertion portion 220b includes a protrusion P and a receiving portion R for allowing the main body 220a to correspond to the protrusion P, and the protrusion P is inserted into the receiving portion R. In order to prevent the protrusion P from coming out from the receiving portion R, the protrusion P may be formed to have a portion that is widened closer to an edge thereof, and the receiving portion R may be formed to correspond to the portion. For such a shape, it is shown that the protrusion P has a trapezoidal planar shape, but the embodiments are not limited thereto, and for example, as shown in an upper row of FIG. 9, various shape that can prevent the protrusion P from coming out from the receiving portion R in a horizontal direction, such as a bulb shape, a hammer shape, a mushroom shape, and the like, may be used.

As shown in the drawing, the protrusion P and the receiving portion R may be formed at all of the side surfaces of the main body 220a and the insertion portion 220b that directly contact each other, or may be formed at one thereof. When the protrusion P and the receiving portion R are formed at all of the side surfaces, as described above, even though the protrusion P is not widened closer to the edge, it is possible to prevent the protrusion P from coming out from the receiving portion R in the horizontal direction. Accordingly, for example, as shown in a lower row of FIG. 9, the protrusion P may be formed to have quadrangular, triangular, or semi-circular planar shapes, and various structures that can limit relative movement of the main body 220a and the insertion portion 220b may be used.

FIG. 8 illustrates cross-sectional shapes of the protrusion P and the receiving portion R. The protrusion P may have a wedge-shaped cross-section that narrows closer to a lower portion thereof, and the receiving portion R may have a cross-section corresponding thereto. When the protrusion P and the receiving portion R have the above-described cross-sections, the main body 220a and the insertion portion 220b may be assembled by using a way of inserting the protrusion P into the receiving portion R from the top of the main body 220a. Due to the wedge shape of the cross-sectional structure, the protrusion P does not come out from the receiving portion R in a downward direction. Accordingly, even though the insertion portion 220b is not separately fixed to the bottom chassis 210 and the main body 220a is merely fixed to the bottom chassis 210, it is possible to maintain the insertion portion 220b to be fixed to the main body 220a and the bottom chassis 210.

Although it has been described that the insertion portion 220b includes the protrusion P and the main body 220a includes the receiving portion R, conversely, the main body 220a may include the protrusion P and the insertion portion 220b may include the receiving portion R. Further, each of the main body 220a and the insertion portion 220b may include at least one of the protrusion P and the receiving portion R.

Referring to FIG. 10, the main body 220a of the supporter 220 is substantially the same as that of the exemplary embodiment of FIG. 5, but the insertion portion 220b includes a first insertion portion 220b1 and a second insertion portion 220b2 that are two pieces. The first insertion portion 220b1 includes a base portion 221b1 and a side wall 222b1, and the second insertion portion 220b2 also includes a base portion 221b2 and a side wall 222b2. One side surface of the first insertion portion 220b1 and one surface of the second insertion portion 220b2 directly contact each other, and two side surfaces of the first insertion portion 220b1, one surface of the second insertion portion 220b2, and two side surfaces of the main body 220a directly contact each other. The side wall 222b1 and the side wall 222b2 directly contact each other as a single bent side wall, but extend in different directions. Accordingly, the supporter 220 has a shape that is bent twice at an end portion thereof, that is, in which the side wall thereof is bent between the side wall 222a of the main body 220a and the side wall 222b1 of the first insertion portion 220b1 and between the side wall 222b1 of the first insertion portion 220b1 and the side wall 222b2 of the second insertion portion 220b2. As described above, the end shape of the supporter 220 may be fitted to the design in which the end portion of light source unit 230 is bent twice. When the light source unit 230 is designed to be bent three times, the supporter 220 may include three or more pieces of insertion portions so that the side wall may be fitted to be bent three times.

Figure 11:
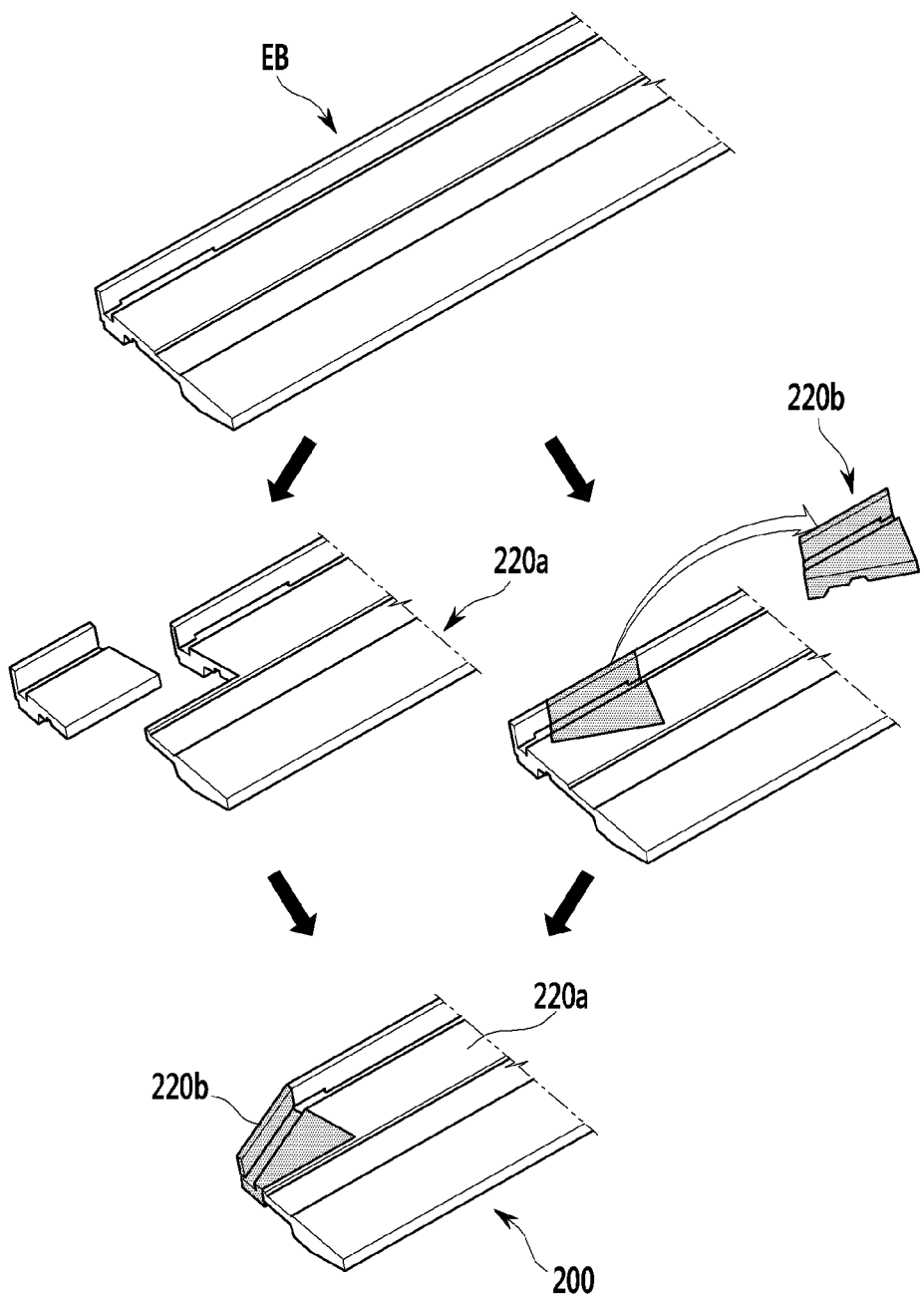
FIG. 11 illustrates a manufacturing process of a supporter according to an exemplary embodiment.
Figure 12:
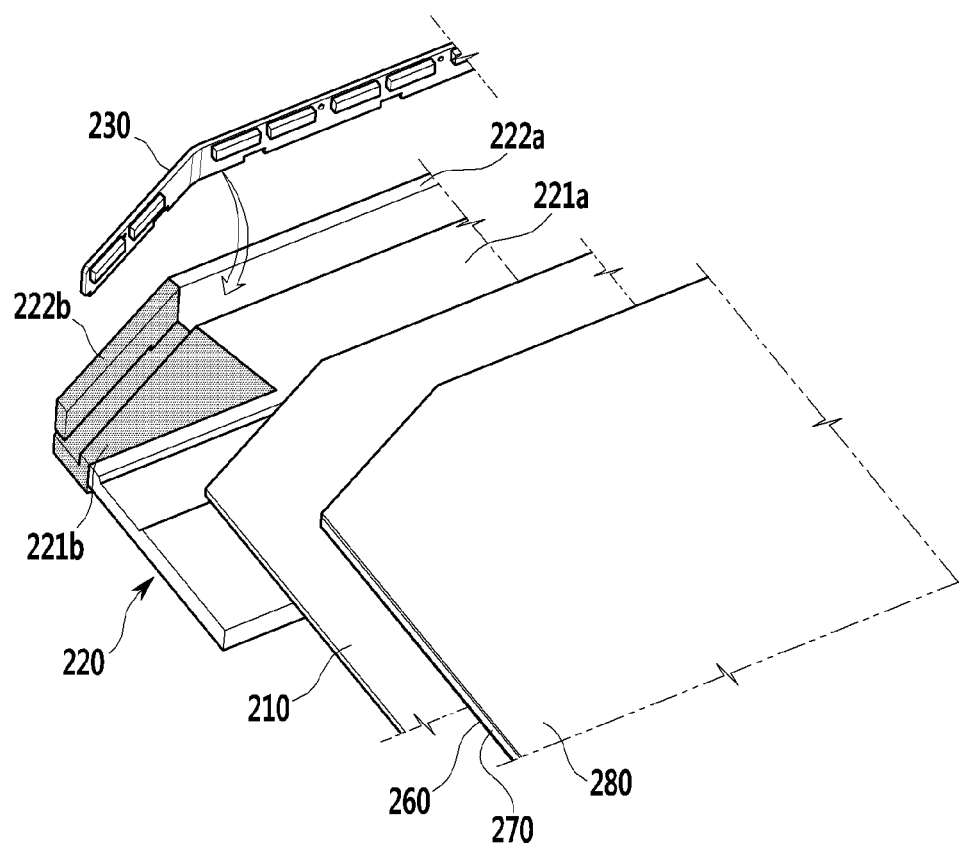
FIG. 12 illustrates an assembling process of a backlight unit according to an exemplary embodiment.

FIG. 11 and FIG. 12 illustrate a manufacturing process of the supporter according to the exemplary embodiment.

The supporter 220 according to the exemplary embodiments may be formed by cutting one extrusion bar EB. If the end portion of the light source unit 230 is not bent but is linear, the supporter 220 may be formed by only cutting the extrusion bar EB including a base portion and a side wall to a predetermined length (which corresponds to the length of the light source unit 230). However, since the light source unit 230 according to the exemplary embodiment is bent and the supporter 220 is formed to be fitted to the light source unit 230, the supporter 220 may not be formed by only cutting the extrusion bar EB to the predetermined length, thus a cutting process for forming the main body 220a and the insertion portion 220b described above is required.

Referring to FIG. 11, the main body 220a of the supporter 220 is formed by cutting the corner area with the side wall, for example, in a rectangular shape from an end portion of the extrusion bar cut to the predetermined length. Further, the insertion portion 220b fitted to the cut corner area of the main body 220a may be formed by cutting a portion including the base portion and the side wall, for example, in a trapezoidal shape from the extrusion bar EB. Next, the supporter 220 as shown in FIG. 5 is formed by inserting the insertion portion 220b obtained by cutting the extrusion bar EB into the cut corner area of the main body 220a. According to the manufacturing method described above, the planar shape of the supporter 220 in which the side wall thereof is bent and the corner thereof is cut may be manufactured by only two processes (i.e., a process of cutting the corner area from the cut extrusion bar and a process of cutting the insertion portion from the extrusion bar), thereby reducing processes and costs.

FIG. 12 illustrates an assembling process of a backlight unit according to an exemplary embodiment.

Referring to FIG. 12, the light source unit 230 is fixed to the side walls 222a and 222b of the supporter 220 manufactured as in FIG. 11 by an adhesion member such as a double-sided adhesive tape or a fastening member such as a screw. The bottom chassis 210 is closely attached to the upper portions of the base portions 221a and 221b of the supporter 220, and may be coupled therewith by a fastening member. The reflective sheet 260, the light guide plate 270, and the optical sheet 280 are sequentially positioned on the bottom chassis 210. The corner areas of the bottom chassis 210, the reflective sheet 260, the light guide plate 270, and the optical sheet 280 may be obliquely cut to correspond to the corner area of the supporter 220, particularly, of the insertion portion 220b.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A backlight unit comprising:
a bottom chassis;
a supporter positioned to extend along one edge of the bottom chassis;
a light source unit fixed to the supporter; and
a light guide plate that is positioned on the bottom chassis and is configured to transmit light emitted from a light source of the light source unit,
wherein the supporter includes a main body of which at least one corner area is cut and an insertion portion that is positioned at the corner area, wherein the main body and the insertion portion are formed as separate pieces,
each of the main body and the insertion portion includes a base portion and a side wall upwardly protruding along an edge of the base portion, wherein the light source unit is fixed to the side wall of the main body and the side wall of the insertion portion, and the side wall of the insertion portion extends from the side wall of the main body and in a direction different than a direction of the side wall of the main body.

2. The backlight unit of claim 1, wherein
two side surfaces of the insertion portion directly contact two side surfaces of the main body.

3. The backlight unit of claim 2, wherein
at a portion at which the two side surfaces of the insertion portion directly contact the two side surfaces of the main body, an upper surface of the base portion of the insertion portion is flush with an upper surface of the base portion of the main body.

4. The backlight unit of claim 1, wherein
the upper surface of the base portion of the insertion portion is substantially trapezoidal.

5. The backlight unit of claim 1, wherein
each of the main body and the insertion portion is fixed to the bottom chassis by a screw.

6. The backlight unit of claim 1, wherein
one of the base portion of the insertion portion and the base portion of the main body includes a protrusion, and the other thereof includes a receiving portion corresponding to the protrusion.

7. The backlight unit of claim 6, wherein
the protrusion includes a portion having a width that widens closer to an end thereof.

8. The backlight unit of claim 6, wherein
the protrusion has a wedge-shaped cross-section.

9. The backlight unit of claim 1, wherein
the insertion portion includes a first insertion portion and a second insertion portion that directly contact each other, and
a direction in which a side wall of the first insertion portion extends and a direction in which a side wall of the second insertion portion extends intersect.

10. The backlight unit of claim 1, wherein
the light source unit includes a substrate and a plurality of light sources mounted to the substrate, and the substrate includes a first portion and a second portion extending from the first portion and is bent at a boundary of the first portion and the second portion.

11. The backlight unit of claim 10, wherein
the first portion of the substrate faces the side wall of the main body of the supporter, and the second portion of the substrate faces the side wall of the insertion portion of the supporter.

12. A manufacturing method of a supporter which fixes a light source unit in a backlight unit, comprising:
forming an extrusion bar that includes a base portion and a side portion;
cutting the extrusion bar to a predetermined length, and forming a main body of the supporter by cutting at least one corner area of the cut extrusion bar;
forming an insertion portion that is fitted to the corner area of the main body by cutting a portion including the base portion and the side portion of the extrusion bar; and
inserting the insertion portion into the corner area of the main body.

13. The manufacturing method of the supporter of claim 12, wherein
in the supporter, a side wall of the insertion portion extends from a side wall of the main body and in a direction different than a direction of the side wall of the main body.

14. The manufacturing method of the supporter of claim 13, wherein
in the supporter, two side surfaces of the insertion portion directly contact two side surfaces of the main body, and at a portion at which the two side surfaces of the insertion portion directly contact the two side surfaces of the main body, an upper surface of the base portion of the insertion portion is flush with an upper surface of the base portion of the main body.

15. The manufacturing method of the supporter of claim 14, wherein
the cutting of the at least one corner area of the cut extrusion bar includes cutting the corner area in a substantially rectangular planar shape.

16. The manufacturing method of the supporter of claim 15, wherein
the cutting of the portion including the base portion and the side portion of the extrusion bar includes cutting the portion in a substantially trapezoid planar shape.

17. A display device comprising:
a display panel; and
a backlight unit that is configured to provide light to the display panel,
wherein the backlight unit includes:
a bottom chassis;
a supporter positioned to extend along one edge of the bottom chassis;
a light source unit fixed to the supporter; and
a light guide plate that is positioned on the bottom chassis and is configured to transmit light emitted from a light source of the light source unit,
wherein the supporter includes a main body of which at least one corner area is cut and an insertion portion that is positioned at the corner area, and
each of the main body and the insertion portion includes a base portion and a side wall, wherein the bottom chassis is between the base portions and the light guide plate, and the side wall of the insertion portion extends from the side wall of the main body and in a direction different than a direction of the side wall of the main body.

18. The display device of claim 17, wherein
two side surfaces of the insertion portion directly contact two side surfaces of the main body, and at a portion at which the two side surfaces of the insertion portion directly contact the two side surfaces of the main body, an upper surface of the base portion of the insertion portion is flush with an upper surface of the base portion of the main body.

19. The display device of claim 17, wherein
the light source unit includes a substrate and a plurality of light sources mounted to the substrate, and
the substrate includes a first portion and a second portion extending from the first portion and is bent at a boundary of the first portion and the second portion.

20. The display device of claim 19, wherein
the first portion of the substrate faces the side wall of the main body of the supporter, and the second portion of the substrate faces the side wall of the insertion portion of the supporter.

21. The display device of claim 17, wherein
the light source unit is positioned between the side walls of the main body and the insertion portion and one end portion of the light guide plate.

22. The display device of claim 17, wherein
a corner of the display device is rounded.

* * * * *